United States Patent [19]

Lacroix

[11] Patent Number: 4,523,924

[45] Date of Patent: Jun. 18, 1985

[54] PROCESS FOR THE PREPARATION OF STABLE AQUEOUS SOLUTIONS OF WATER-SOLUBLE REACTIVE DYES BY MEMBRANE SEPARATION

[75] Inventor: Roger Lacroix, Village-Neuf, France

[73] Assignee: Ciba-Geigy Corporation, Ardsley, N.Y.

[21] Appl. No.: 560,654

[22] Filed: Dec. 12, 1983

[30] Foreign Application Priority Data

Dec. 20, 1982 [CH] Switzerland ............... 7430/82
Aug. 5, 1983 [CH] Switzerland ............... 4265/83

[51] Int. Cl.$^3$ .................. C09B 67/26; D06P 3/66
[52] U.S. Cl. ........................... 8/527; 8/543; 8/918; 210/683
[58] Field of Search ................... 8/543, 527

[56] References Cited

U.S. PATENT DOCUMENTS 3,857,782 12/1974 Crowley ............... 210/646
3,872,001 3/1975 Davis et al. ........... 210/638
4,247,401 1/1981 Bloch et al. ........... 210/638

FOREIGN PATENT DOCUMENTS 26399 4/1981 European Pat. Off.
88727 9/1983 European Pat. Off.
1359898 7/1974 United Kingdom.
2106420 4/1983 United Kingdom.

*Primary Examiner*—A. Lionel Clingman
*Attorney, Agent, or Firm*—Edward McC. Roberts; Kevin T. Mansfield

[57] ABSTRACT

The invention describes a process for the preparation of stable aqueous solutions of water-soluble reactive dyes, starting from an aqueous solution or suspension of the crude reactive dye which is concentrated and at least partially desalted by a membrane separation process. The process of the invention comprises continuously replacing part of the water which is drawn off from the dyestuff solution or suspension during the membrane separation process with demineralized water, whereby the concentration of calcium and magnesium ions in the dyestuff solution does not exceed 0.01% by weight. The concentrated and desalted dyestuff solution is stabilized by addition of a polyphosphate or dihydrogen phosphate/polyphosphate buffer, and a component which improves the water-solubility of the dye is optionally added.

The formulations so obtained are readily storable for several months in the temperature range from $-10°$ to $+40°$ C.

11 Claims, No Drawings

PROCESS FOR THE PREPARATION OF STABLE AQUEOUS SOLUTIONS OF WATER-SOLUBLE REACTIVE DYES BY MEMBRANE SEPARATION

The present invention relates to a process for the preparation of stable aqueous solutions of water-soluble reactive dyes, to the dyestuff solutions obtained by said process and to the use thereof for dyeing and printing cellulosic fibre material.

Liquid dyestuff formulations (solutions or suspensions) have a number of advantages compared with powdered formulations, e.g. no development of dust when preparing padding and dye liquors or printing pastes, no wetting problems caused by the formation of lumps, and no specky dyeings caused by insufficiently dissolved or insufficiently dispersed dye particles.

However, the stability of liquid formulations when stored for substantial periods of time is often unsatisfactory compared with that of correspondingly formulated dye powders or granulates. Particular problems arise with aqueous solutions of reactive dyes whose reactive group is rendered inactive by hydrolysis during storage. The consequence of this can be a poor dye yield on application of the dyes. In order to prevent hydrolysis as far as possible, it is common practice to add a buffer to such formulations and thus to bring the pH to a value in and around the neutral point.

The demands made of liquid formulations of reactive dyes which are at present commercially available are very stringent with respect to temperature stability. It is not only a question of the resistance to hydrolysis; the formulations must also be stable for several months in the temperature range from $-10°$ to $+40°$ C. without resulting in dye precipitation or in crystallisation of the buffer system added to the formulation.

When preparing solutions having a dye concentration of up to 30% and over, and from which no dye will precipitate even during prolonged storage, it has proved very effective to reduce the content of inert salts in the crude dye. This is achieved most simply as described e.g. in British Pat. No. 1,359,898 with the aid of a membrane separation process, using membranes which are permeable only to low molecular substances such as inorganic inert salts. The reservation must be made, however, that the hitherto known membranes selectively retain alkaline earth metal cations, in particular calcium and magnesium ions, with the consequence that the dyestuff solutions obtained by membrane separation methods have a calcium or magnesium ion concentration of up to 0.06% by weight, depending on the degree of hardness of the mains water used for washing out the inert salts. This relatively high concentration of calcium and magnesium is undesirable, as buffer systems which contain polyphosphate are highly sensitive, resulting in precipitation, especially at elevated temperature.

On the other hand, the frequently used hydrogen phosphate/dihydrogen phosphate buffer has a tendency to crystallise at temperatures around 0° C. Crystals which have precipitated at low temperature generally do not dissolve again on warming the formulation to room temperature, but deposit in the form of an insoluble residue on the bottom of the transport container. The stability and applicability of such formulations is thereby greatly impaired or even prevented.

It is the object of the present invention to provide stable aqueous solutions of reactive dyes which, even after storage for several months in the temperature range from $-10°$ to $+40°$ C., do not result in the formation of insoluble precipitations and deposits. This object is accomplished by desalting the crude dye by a membrane separation process on the one hand and, on the other, by replacing the hydrogen phosphate/dihydrogen phosphate buffer conventionally added to liquid formulations with a polyphosphate or dihydrogen phosphate/polyphosphate buffer, and carrying out said membrane separation process such that the total concentration of calcium and magnesium ions in the dye solution does not exceed 0.01% by weight.

Accordingly, the invention relates to a process for the preparation of stable aqueous solutions of water-soluble reactive dyes, starting from an aqueous solution or suspension of the crude reactive dye which is concentrated by means of a membrane separation process and at least partially removing salts therefrom, which process comprises continuously replacing part of the water drawn off from the dye solution during the membrane separation process with demineralised water, whereby the concentration of calcium and magnesium ions in the dyestuff solution does not exceed 0.01% by weight, stabilising the concentrated and desalted dyestuff solution by addition of a polyphosphate or dihydrogen phosphate/polyphosphate buffer, and optionally adding a component which improves the water-solubility of the dye.

Aqueous stable solutions of reactive dyes are prepared by the process of this invention especially from those reactive dyes which contain sulfo groups and which contain, as fibre-reactive radical, at least one 2,3-dichloroquinoxalinyl, monochlorotriazinyl, dichlorotriazinyl, monofluorotriazinyl, monofluoropyrimidinyl, difluoropyrimidinyl, di- or trichloropyrimidinyl or chlorodifluoropyrimidinyl radical. Chemically speaking, such dyes are e.g. metal-free, metallised or metallisable monoazo, disazo and polyazo dyes, pyrazolone, thioxanthrone, oxazine, stilbene, formazane, anthraquinone, nitro, methine, styryl, azastyryl, triphenylmethane or phthalocyanine dyes, and, preferably, dyes of the azo, anthraquinone and phthalocyanine series.

The dyes can be subjected direct in the form of their synthesis solutions or suspensions to the membrane separation process. It is, however, also possible to start from a dry crude dye which is first dissolved or suspended in water and then desalted and concentrated by the membrane process.

When carrying out the membrane separation process, the aim is to achieve a salt removal of over 90%, i.e. that less than 1% by weight, preferably less than 0.5% by weight, of salt will remain in the dye solution.

The salts washed out by means of the membrane are e.g. sodium and potassium salts such as potassium chloride, potassium sulfate or potassium hydrogen sulfate, and, in particular, sodium chloride, which salts have been added to the synthesis solution to neutralise it or to salt out the dye.

The term "membrane separation process" will be understood as meaning in particular hyperfiltration. In contradistinction to conventional filtration, in which solid particles are separated from a liquid, this separation process is a selective molecular separation method. The membrane acts as a molecular sieve and is able to retain dissolved substances, if the molecular size is sufficient, on the contact surface of the membrane. It is convenient to use membranes with a cut-off level having a retention of at least 90% when these are subjected to hyperfiltration for 20 to 30 minutes. Such membranes are those having a cut-off level in the molecular weight range of 300 to 800, preferably of 400 to 500, and which are symmetrical or asymmetrical. They permit water and dissolved substances whose molecular weight is below the cut-off level to pass through under low to medium pressure. In the process of this invention, pressures of 10 to 100 bar, preferably of 10 to 30 bar, are applied.

Useful membranes are in particular those made from cellulose acetate, polyvinyl alcohol or polyacrylonitrile and which are modified by reactive dyes containing sulfo and/or carboxyl groups. Such membranes are described e.g. in No. DE-OS 25 05 254. The membranes have a pore diameter of 0.1 to 50 nm.

The concentrated reactive solution of low salt content, which contains virtually no $Ca^{++}$ and $Mg^{++}$ ions after the membrane separation process, is stabilised by addition of a polyphosphate or dihydrogen phosphate/polyphosphate buffer. The preferred polyphosphate is tripolyphosphate. Dihydrogen phosphate and polyphosphate are usually employed in the form of their alkali metal salts.

The final dystuff formulation will preferably contain the buffer in a concentration of 0.5 to 5% by weight. Where a dihydrogen phosphate/polyphosphate mixture is used as a buffer, the polyphosphate component will be present in the greater amount. The dihydrogen phosphate makes possible a precise adjustment of the pH value of the dyestuff solution, which value is preferably in the range from 7 to 8.

Besides the buffer, a component which improves the water-solubility of the dye is optionally added to the concentrated and desalted solution. Such a component is preferably ε-caprolactam and N-methylpyrrolidone.

It is also possible to add small amounts of other improving ingredients (about 1 to 10 g/l of each) which are inert to the reactive dye to the solutions obtained by the process of the invention. Examples of such additional ingredients are textile auxiliaries, foam inhibitors, fungistats and bacteriostats.

The invention further relates to the stable aqueous solutions of fibre-reactive dys obtained by the process of the invention, and to the use thereof for preparing padding liquors, dyebaths and printing pastes for dyeing and printing natural and regenerated cellulosic fibre materials, especially cotton and viscose fibres.

The dyestuff solutions preferably have the following composition:
10 to 40% by weight of a water-soluble reactive dye,
0.5 to 5% by weight of a polyphosphate or dihydrogen phosphate/polyphosphate buffer,
less than 0.01% by weight of calcium or magnesium ions,
less than 1% by weight of inert salts,
50 to 85% by weight of water, and optionally
1 to 20% by weight of a component which increases the water-solubility of the dye.

The invention is illustrated by the following Examples in which parts and percentages are by weight, unless otherwise indicated. In some Examples no specific value is given for the concentration of dye in the liquid formulation and a range is indicated instead, as different concentrations are obtained, depending on the length of time of the hyperfiltration (reverse osmosis).

EXAMPLE 1

11 kg of the filter cake of the dye of the formula

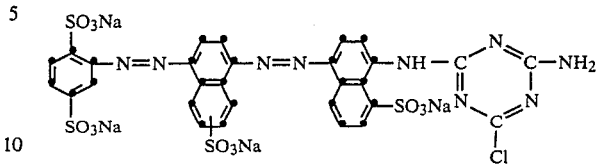

are suspended in 24 kg of demineralised water. This suspension, with a solids content of 12.1% (5.2% of NaCl), is desalted in a reverse osmosis unit (surface area of membrane: 0.84 m$^2$) and concentrated using a membrane made of modified cellulose acetate (preparation as described in Example 1 of No. DE-OS 25 05 254) which has a cut-off level of 500. The reverse osmosis is carried out at pH 6.5–7.5 at a temperature of about 20° C. and under a pressure of 25 bar. During the reverse osmosis, 45 liters of demineralised water are added and 69 liters of permeate are removed. There are obtained 9.8 kg of a concentrated dyestuff solution with a solids content of about 25% (0.1% of NaCl) and about 40.10$^{-4}$% of $Ca^{++}$.

2 parts of sodium tripolyphosphate (NaTPP) and 0.15 part of $NaH_2PO_4.2H_2O$ and 0.85 part of demineralised water are stirred into 97 parts of the above dyestuff solution at room temperature over 10 minutes, to give a low viscosity liquid formulation of the following composition which remains stable for several months at −10° to +40° C.:
24 to 27% of dye
2.0% of NaTPP
0.15% of $NaH_2PO_4.2H_2O$
about 0.1% of NaCl
about 0.004% of $Ca^{++}$
remainder: water.
The solution has a pH of about 7.4.

EXAMPLE 2

10 kg of the filter cake of the dye of the formula

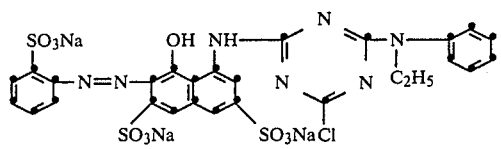

are suspended in 33 kg of demineralised water. The resultant suspension with a solids content of 9.9% (1.75% of NaCl) is desalted and concentrated in one step in a reverse osmosis unit as described in Example 1. During the salt removal and concentrating, 45 liters of demineralised water are added and 75 liters of permeate are removed. 13 kg of a dyestuff solution with a solids content of about 27% (0.04% of NaCl) are obtained.

93.3 parts of the above dyestuff solution are buffered with 1.5 parts of NaTPP and 0.15 part of $NaH_2PO_4.2H_2O$ and diluted with 4.9 parts of demineralised water. The low viscosity liquid formulation so obtained remains stable for 6 months at −10° to +40° C. The formulation has the following composition:
23 to 26% of dye
1.5% of NaTPP
0.15% of $NaH_2PO_4.2H_2O$ <0.04% of NaCl
<0.001% of Ca++
remainder: water
pH: 7.5.

If reverse osmosis of the same dye is carried out with mains water and without the addition of demineralised water, distinct precipitations of Ca/Na-polyphosphate in the liquid formulation so obtained are observed after 15 days.

EXAMPLE 3

12 kg of the filter cake of the formula

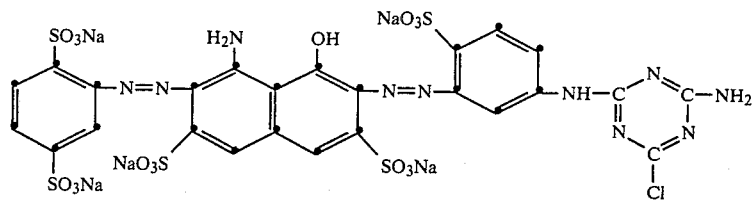

are suspended in 33 kg of demineralised water. This suspension with a solids content of 12.8% (1.33% of NaCl) is desalted and concentrated as described in Example 1.

During the desalting and concentrating, 45 liters of demineralised water are added and 70 liters of permeate are removed. About 20 kg of a dyestuff solution with a solids content of about 23% (0.1% of NaCl) and 80.10$^{-4}$% of Ca++ are obtained.

60 parts of the above dyestuff solution are buffered with 1.5 parts of NaTPP and 0.17 part of NaH$_2$PO$_4$.2H$_2$O and diluted with 15 parts of ε-caprolactam and 23.3 parts of demineralised water.

The liquid formulation so obtained has a pH of 7.4 and the following composition:
13 to 16% of dye
15.0% of ε-caprolactam
1.5% of NaTPP
0.17% of NaH$_2$PO$_4$.2H$_2$O
about 0.06% of NaCl
about 0.005% of Ca++
remainder: water

EXAMPLE 4

10 kg of filter cake of the dye of the formula

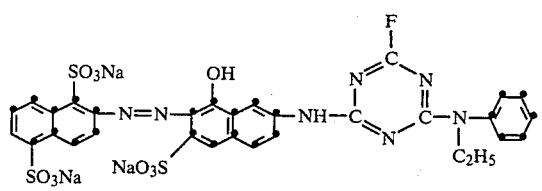

are suspended in 35 kg of demineralised water. The resultant suspension with a solids content of 11.5% (1.3% of NaCl) is subjected to reverse osmosis as described in Example 1. During the salt removal and concentrating, 25 liters of demineralised water are added and 49 liters of permeate are removed. A dyestuff solution with a solids content of 23.3% (0.8% of NaCl) and 40.10$^{-4}$% of Ca++ are obtained.

64 parts of the above dyestuff solution are buffered with 2.0 parts of NaTPP and 0.15 part of NaH$_2$PO$_4$.2H$_2$O and diluted with 34.35 parts of demineralised water. The low viscosity liquid formulation so obtained has a pH of 7.4 and is stable for several months at −10° to +40° C. The formulation has the following composition:
14.9% of dye
2.0% of NaTPP
0.15% of NaH$_2$PO$_4$.2H$_2$O
about 0.05% of NaCl
about 0.0025% of Ca++
82.9% of water.

EXAMPLE 5

40 kg of the solution from the synthesis of the crude dye of the formula with a solids content of 15.1% (salt content: 3.24%) are desalted and concentrated in a single step a reverse osmosis unit as described in Example 1. During the salt removal and concentrating, 55 liters of demineralised water are added and 80 liters of permeate are removed. About 15 kg of a dyestuff solution with a solids content of about 28% (<0.2% NaCl) and 78.10$^{-4}$% of Ca++ are obtained.

95 parts of the above dyestuff solution are buffered with 2 part of NaTPP and 0.1 part of NaH$_2$PO$_4$.2H$_2$O and diluted with 3 parts of ε-caprolactam. The liquid formulation so obtained with a pH of 7.4 has the following composition:
24 to 28% of dye
3.0% of ε-caprolactam
2.0% of NaTPP
0.1% of NaH$_2$PO$_4$.2H$_2$O
<0.2% of NaCl
about 0.007% of Ca++
remainder: water.

EXAMPLE 6

45 kg of the solution from the synthesis of the crude dye of the formula

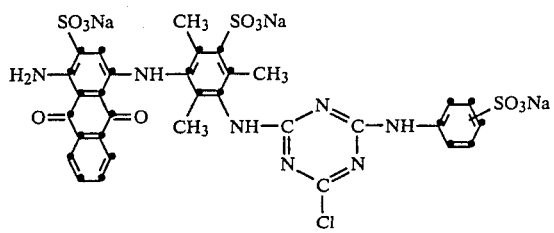

with a solids content of 16.0% (salt content: 1.74%) are desalted and concentrated in one step as described in Example 1, with 23.7 liters of permeate being removed. 21.3 kg of a concentrated dyestuff solution with a solids content of 30.1% (<0.78% of sodium chloride) are obtained.

89 parts of the above dyestuff solution are buffered with 1.6 parts of NaTPP and 0.2 part of $NaH_2PO_4 \cdot 2H_2O$ and diluted with 5 parts of ε-caprolactam and 4.2 parts of demineralised water. The liquid formulation with a pH of 7.3 so obtained has the following composition:

26.0% of dye
5.0% of ε-caprolactam
1.6% of NaTPP
0.2% of $NaH_2PO_4 \cdot 2H_2O$
about 0.7% of NaCl
about 0.008% of $Ca^{++}$
66.5% of water.

EXAMPLE 7

About 60 kg of the solution from the synthesis of the 1:2 metal complex dye of the formula tion with a pH of 7.4 so obtained remains stable for several months at −10° to +40° C. and has the following composition:
21 to 24% of dye
2.2% of NaTPP
about 0.0028% of $Ca^{++}$
remainder: water.

EXAMPLE 8

10 kg of the filter cake of the dye of the formula

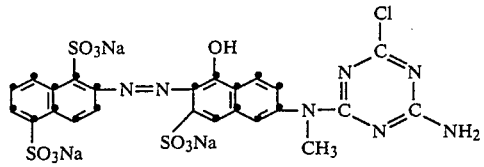

are suspended in about 25 kg of demineralised water. The suspension so obtained, with a solids content of 13.2% (3.0% of NaCl), is desalted and concentrated in a reverse osmosis unit (surface area of membrane: 0.84 m$^2$) as described in Example 1. During the salt removal and concentrating, 35 liters of demineralised water are added and 58 liters of permeate are removed. About 12 kg of a dyestuff solution with a solids content of about 29% (content of NaCl: <0.1%) are obtained.

79.2 parts of the above dyestuff solution are buffered with 1.5 parts of NaTPP and diluted with 19.3 parts of demineralised water, to give a low viscosity liquid formulation which remains stable for 6 months at −10° to +40° C. and has the following composition:
21 to 24% of dye

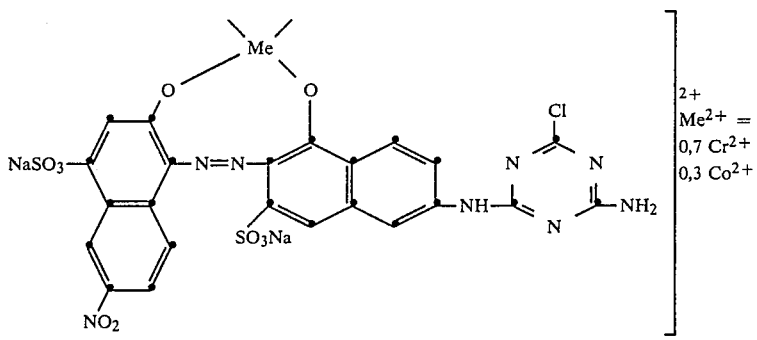

with a solids content of 19.4% (salt content: 2.8%) are desalted and concentrated as described in Example 1. During the salt removal and concentrating, 45 liters of demineralised water are added and 80 liters of permeate are removed. About 25 kg of a concentrated dyestuff solution with a solids content of about 35% (0.18% of NaCl) and about $45 \cdot 10^{-4}$% of $Ca^{++}$ are obtained.

67.4 parts of the above dyestuff solution are buffered with 2.2 parts of NaTPP and diluted with 30.4 parts of demineralised water. The low viscosity liquid formula- 1.5% of NaTPP
<0.1% of NaCl
about 0.006% of $Ca^{++}$
remainder: water.
The liquid formulation has a pH of 7.9.

EXAMPLE 9

45 kg of the solution from the synthesis of the crude dye of the formula

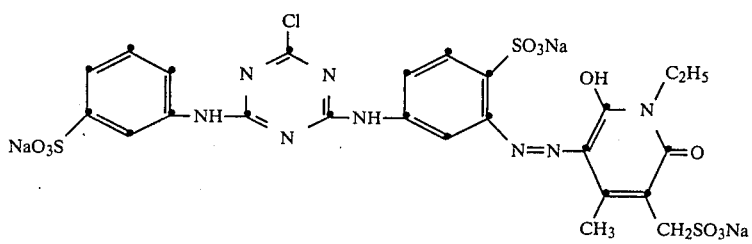

with a solids content of 16% (salt content: 5.9%) are desalted and concentrated as described in Example 1. 75 liters of demineralised water are added and 105 liters of permeate are removed during the reverse osmosis. 15 kg of a dyestuff solution with a solids content of about 30% are obtained. The concentration of sodium chloride is <0.2% and the calcium ion concentration is $55.10^{-4}\%$.

62 parts of the concentrated and desalted dyestuff solution are buffered with 0.8 part of sodium tripolyphosphate and diluted with 37.2 parts of water. The low viscosity liquid formulation with a pH of 7.5 so obtained remains stable for several months at $-10°$ to $+40°$ C. and has the following composition:
17 to 19% of dye
0.8% of NaTPP
about 0.0034% of Ca++
remainder: water.

EXAMPLE 10

9 kg of the filter cake of the dye of the formula

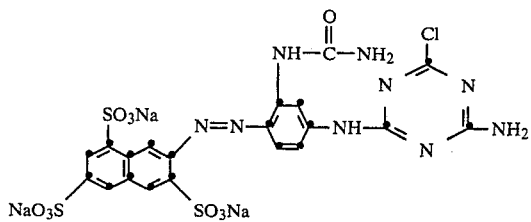

are suspended in about 27 l of demineralised water. The dye suspension so obtained has a solids content of 12.1% (2.3% of NaCl) and is desalted and concentrated as described in Example 1. 30 liters of demineralised water are added and about 54.5 liters of permeate are removed during the reverse osmosis. The dyestuff solution obtained at the conclusion of the reverse osmosis (about 11.5 kg) has a solids content of 28.9% (0.1% of NaCl; $62.10^{-4}\%$ of Ca-ions).

48 parts of the above dyestuff solution is buffered with 1 part of NaTPP and, after addition of 5 parts of caprolactam, diluted with 46 parts of demineralised water. The liquid formulation with a pH of 7.6 so obtained has the following composition:
14% of dye
5% of caprolactam
1% of NaTPP
0.003% of Ca++
80% of water.

EXAMPLE 11

10 kg of the filter cake of the dye of the formula

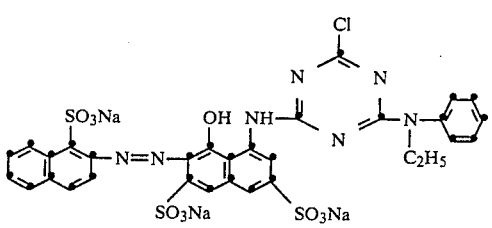

are suspended in 35 kg of demineralised water. The dye suspension so obtained, with a solids content of 12.2% (1% of NaCl), is desalted and concentrated by reverse osmosis as described in Example 1. During the reverse osmosis, 40 liters of demineralised water are added and a total of 62 kg of permeate are removed. There are obtained 23 kg of a dye suspension with a solids content of about 22% (<0.1% of NaCl; $36.10^{-4}\%$ of Ca-ions).

82.5 parts of the concentrated and desalted dye suspension are buffered with 1.5 parts of sodium polyphosphate and diluted with 6 parts of demineralised water and 10 parts of caprolactam. The liquid formulation so obtained has a pH of 7.5 and has the following composition:
16 to 19% of dye
10% of caprolactam
1.5% of NaTPP
0.003% of Ca++
remainder: water.

What is claimed is:

1. A process for the preparation of a stable aqueous formulation which contains a water-soluble reactive dye, comprising the steps of
    (i) treating, under a pressure of 10 to 100 bar, an aqueous solution or suspension of the crude dye with a semipermeable asymmetrical membrane, suitable for reverse osmosis and having a pore diameter of 0.1 to 50 nm, which membrane is modified by polyfunctional compounds containing ionic groups, the basic skeleton consisting of cellulose acetate, polyacrylonitrile or a copolymer of acrylonitrile and ethylenically unsaturated monomer; so as to concentrate the dye solution and at least partially remove salts therefrom; and, at the same time, replacing part of the water which is drawn off from the dye solution or suspension with demineralized water so that the total calcium and magnesium ion concentration does not exceed 0.01% by weight and
    (ii) further stabilizing the obtained dye solution by addition of a polyphosphate or dihydrogen phosphate/polyphosphate buffer.

2. The process of claim 1, wherein the overall salt concentration in the dye solution is lowered to less than 1% by weight.

3. The process of claim 2, wherein the salt concentration is lowered to less than 0.5% by weight.

4. The process of claim 1, wherein the buffer is a tripolyphosphate or dihydrogen phosphate/tripolyphosphate mixture.

5. The process of claim 1, wherein the buffer is added in an amount of 0.5 to 5% by weight, based on the final dyestuff formulation.

6. The process of claim 1, wherein the pH of the dyestuff solution is adjusted to 7–8 by addition of the buffer.

7. The process of claim 1, wherein a component is added which further improves the water-solubility of the dye.

8. The process of claim 6, wherein $\epsilon$-caprolactam or N-methylpyrrolidone is added.

9. An aqueous dye solution obtained by the process of claim 1, said solution comprising
- 10 to 40% by weight of a water-soluble reactive dye,
- 0.5 to 5% by weight of a polyphosphate or dihydrogen phosphate/polyphosphate buffer, less than 0.01% by weight of calcium and/or magnesium ions, less than 1% by weight of inert salts, 50 to 85% by weight of water.

10. The dye solution of claim 9, which further contains 1 to 20% by weight of a component which improves the water-solubility of the dye.

11. A process for dyeing or printing cellulose fiber material, which comprises applying to said material a dye solution obtained by the process of claim 1.

* * * * *